(12) United States Patent
Napolez et al.

(10) Patent No.: US 7,252,051 B2
(45) Date of Patent: Aug. 7, 2007

(54) NECK MOTION DETECTOR AND METHOD FOR BARK CONTROL DEVICE

(75) Inventors: Francisco J. Napolez, Tucson, AZ (US); Timothy T. Duncan, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 581 days.

(21) Appl. No.: 10/753,113

(22) Filed: Jan. 7, 2004

(65) Prior Publication Data

US 2005/0145200 A1 Jul. 7, 2005

(51) Int. Cl.
*A01K 15/02* (2006.01)
*A01K 27/00* (2006.01)

(52) U.S. Cl. .................................. 119/718; 119/719
(58) Field of Classification Search ............... 119/718, 119/712, 719, 859
See application file for complete search history.

(56) References Cited

U.S. PATENT DOCUMENTS

| | | | | |
|---|---|---|---|---|
| 4,876,674 A | * | 10/1989 | Parmely et al. ............. | 119/859 |
| 4,947,795 A | * | 8/1990 | Farkas ......................... | 119/718 |
| 5,153,566 A | * | 10/1992 | Yun ............................ | 340/689 |
| 5,430,435 A | * | 7/1995 | Hoch et al. ............... | 340/573.7 |
| 5,601,054 A | * | 2/1997 | So .............................. | 119/718 |
| 5,694,340 A | * | 12/1997 | Kim ........................... | 702/141 |
| 5,799,618 A | * | 9/1998 | Van Curen et al. ......... | 119/721 |
| 5,815,077 A | * | 9/1998 | Christiansen ............ | 340/573.3 |
| 6,263,836 B1 | * | 7/2001 | Hollis ........................ | 119/712 |
| 6,487,992 B1 | * | 12/2002 | Hollis ........................ | 119/712 |

\* cited by examiner

*Primary Examiner*—Bret Hayes
(74) *Attorney, Agent, or Firm*—Cahill, von Hellens & Glazer P.L.C.

(57) ABSTRACT

An electronic apparatus (1) for control of vocalization by a dog includes first and second stimulus electrodes (5) connected to a surface (9) of the housing, a vibration sensor (6), control circuitry in the housing having an input coupled to an output of the sensor, and a motion detector connected in substantially fixed relationship to the dog's neck for producing a motion detection signal in response to a characteristic movement of the dog's neck that accompanies barking and providing the motion detection signal as an input to the control circuitry. The control circuitry includes output terminals for producing aversive stimulus signals between the first and second stimulus electrodes in response to the motion detection signal and a signal produced by the vibration sensor.

7 Claims, 11 Drawing Sheets

NECK MOTION DETECTOR AND METHOD FOR BARK CONTROL DEVICE

BACKGROUND OF THE INVENTION

The present invention relates generally to collar-mounted electronic "bark limiter" or dog bark training devices, and more particularly to improvements therein which reduce the size, weight and power consumption thereof without reducing the open circuit stimulus voltage, allow improved, more reliable sensing of vibration due to barking of the dog, provide improved sensing of what constitutes valid barking, allow monitoring of the amount of valid barking that actually occurs, and provide low-power standby operation when the dog is not barking.

A variety of electronic dog training collars have been utilized for applying electrical shock and/or audible stimulus to a dog when it barks. In many situations it is highly desirable to prevent individual dogs or groups of dogs from barking excessively. For example, one dog's barking in a kennel is likely to stimulate other dogs to bark. This is undesirable with respect to the welfare of the dogs themselves and nearby people. Similar problems occur in neighborhoods in which there are dogs that are kept outside at night: if one dog starts barking others are likely to join in, causing a general disturbance.

The closest prior art is believed to include the present assignee's Bark Limiter product and commonly assigned U.S. Pat. No. 4,947,795 by G. Farkas entitled "Barking Control Device and Method", issued Aug. 14, 1990 and incorporated herein by reference.

The Tri-Tronics collar-mounted Bark Limiter product has been successfully marketed by the present assignee for many years. It has been very successful in the market because it effectively controls unwanted barking of large and medium-sized dogs. Its large size has allowed use of large batteries to power the circuitry that enables the Bark Limiter product to produce a substantial level of stimulation, which has been a major reason for the product's success. However, the large size and weight of the assignee's Bark Limiter product have limited it to use on medium-sized and large-sized dogs. Competitive products that have been smaller in size and weight and therefore have been usable on a small or tiny dogs have been introduced to the market, but their small size evidently has necessitated a substantial reduction in the level of stimulation that such products can produce in response to the dog's barking.

Above mentioned U.S. Pat. No. 4,947,795 discloses a bark training device which allows a dog to control the level of electrical stimulus in response to its own barking behavior. This patent discloses circuitry in a collar-mounted electrical device that detects the onset of barking and initially produces only a single low level electrical stimulus pulse that gets the dog's attention, but does not initially produce a highly unpleasant level of stimulation. If the dog continues barking, the stimulation levels of the electrical shock pulses are increased at the onset of each barking episode in a stepwise fashion until the stimulus becomes so unpleasant that the dog stops barking for at least a predetermined time, e.g., one minute. After that minute elapses, the circuitry resets itself to its lowest initial stimulation level and remains inactive until barking begins again, and then repeats the process, beginning with the lowest level of stimulation and increasing the stimulus level if barking continues. In one embodiment, a certain duration, e.g., 30 seconds, of "watchdog barking" is permitted before the initial stimulus pulse is applied to get the dog's attention, after which continued "nuisance barking" results in gradual increasing in the intensity of the aversive stimulus up to a maximum level until the barking stops for at least one minute. (However, the assignee's above mentioned Bark Limiter product does not use the algorithm described in U.S. Pat. No. 4,947,795 for producing increased stimulation in response to increased levels of barking, and instead provides a fixed duration stimulation with detection of an initial onset of barking, and provides a half second duration of stimulation with two seconds of pause, which is easily implemented and has been proven to be very effective.)

A shortcoming of the prior art bark training products is that they detect nearly any sound the dog makes and automatically shock the dog in response to the detected sound. The stimulation intensity can be changed only by removing the stimulation electrodes and replacing them with different stimulation electrodes having different series resistances. The battery life of some prior bark limiters has been undesirably short because dog owners often find it convenient to leave the devices in a "power on" condition for long periods of time, even during times when the dog is not likely to be barking. Also, the larger, more effective prior art bark control devices are too large to use on a small or tiny dog.

Yet another shortcoming of prior bark control devices is that they have an on/off switch, and occasionally when the dog scratches with its hind foot, it unintentionally contacts the power switch and turns off the power of the bark control device. The dog may learn that by "scratching" in a certain way it can turn the bark control device off.

There also is an unmet need for a small, lightweight bark control device that provides long battery life using relatively inexpensive batteries.

There also is an unmet need for a small, lightweight, highly effective bark control device that is small and light enough to be readily worn by a small or tiny dog.

There also is an unmet need for way of substantially reducing the power consumption of a animal training device.

There also is an unmet need for an improved bark control device that avoids accidental stimulation of the dog in the event that the battery voltage is too low.

SUMMARY OF THE INVENTION

It is an object of the invention to provide a small, lightweight bark control device that provides long battery life using an inexpensive battery.

It is another object of the invention to provide an improved bark control device that cannot be accidentally or deliberately turned off by a dog's scratching activity.

It is another object of the invention to provide a small, lightweight, highly effective bark control device that can be worn by a small or tiny dog.

It is another object of the invention to provide a way of substantially reducing the power consumption of an animal training device.

It is another object of the invention to provide an improved bark control device that avoids accidental stimulation of the dog in the event that the battery voltage is too low.

Briefly described, and in accordance with one embodiment, the present invention provides an electronic apparatus (1) for control of vocalization by a dog including a housing (2) supported against the animal's skin, first and second stimulus electrodes (5) connected to a surface (9) of the housing, a vibration sensor (6) supported by the housing, control circuitry in the housing having an input coupled to an output of the sensor, the control circuitry including output terminals producing aversive stimulus signals between the first and second stimulus electrodes in response to the signals produced by the sensor, and a motion detector connected in substantially fixed relationship to a portion of the dog for producing a motion detection signal in response to a characteristic movement of the portion of dog that accompanies barking by the dog and providing the motion detection signal as an input to the control circuitry. In a described embodiment, the motion detection signal as provided as an enable input to the control circuitry.

In the described embodiment, the control circuitry operates to reset the control circuitry from a low-power operating mode to a normal operating mode in response to the motion detection signal to enable the control circuitry to produce the aversive stimulus signals.

In the described embodiment, the control circuitry includes a microcontroller (33) storing a program for changing the operating mode of the microcontroller from the low speed, low-power operating mode to a high-speed, higher power operating mode in response to the head motion detection signal.

DETAILED DESCRIPTION OF THE PREFERRED EMBODIMENTS

A preferred embodiment of a dog bark limiter of the present invention includes a motion detector that detects characteristic motion of the dog's neck produced as a result of barking and in response automatically powers up the circuitry from a very low power stand by operating condition.

A technique of "valid" bark detection uses software wherein a capture and compare routine is executed in the software to accomplish the function of, in effect, generating a frequency spectrum of the received sound and compared with a predetermined frequency spectrum to determine if the sound constitutes a "valid" bark. A self-test mode is provided to self-test or verify operability of the neck motion sensor and the sound vibration sensor.

Figure 1:
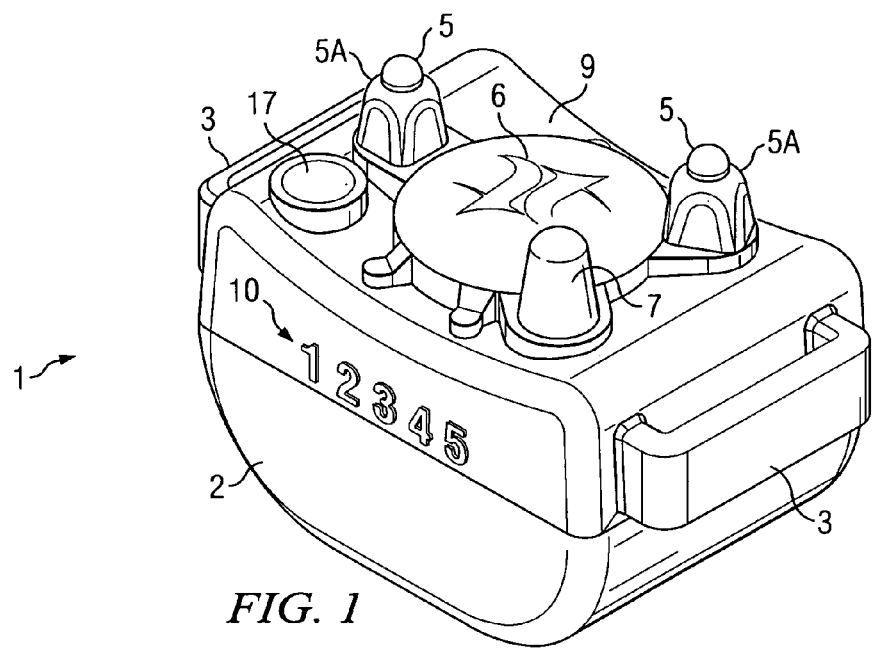
FIG. 1 is a perspective view of a collar-mounted bark limiter unit of the present invention with the collar removed.
Figure 2:
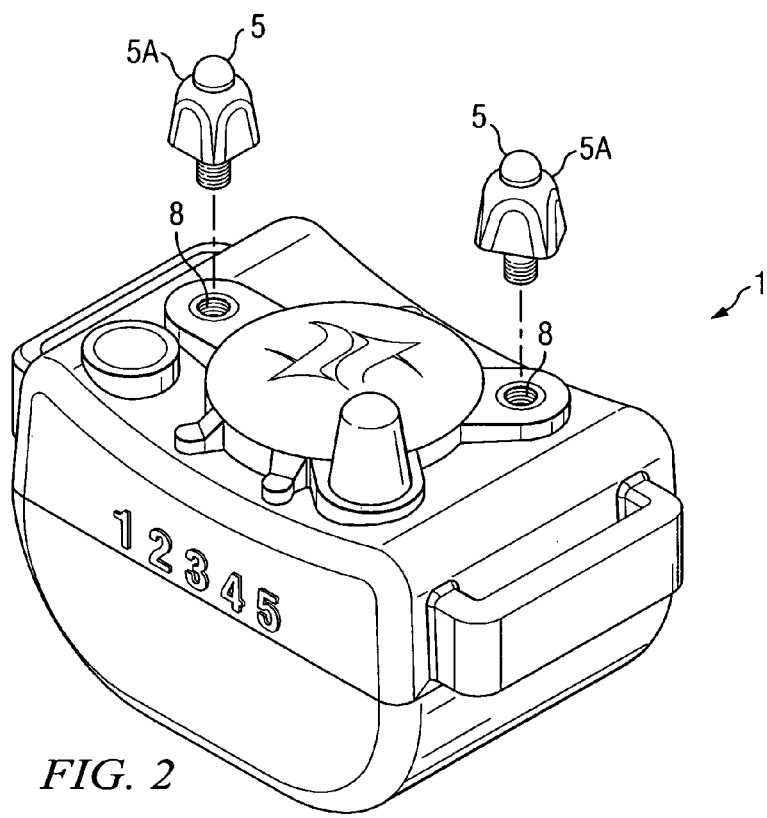
FIG. 2 shows the a partially-exploded view of the bark limiter unit of FIG. 1.

Referring to FIGS. 1, 2, 3A and 3B, bark limiter 1 includes a housing 2 having a lower section 2A and an upper section 2B. The top surface 9 of upper housing section 2B is slightly concave, to better accommodate the curvature of a dog's neck. A pair of collar-retaining loops 3 are attached to opposite ends of upper housing section 2B, as shown. A typical dog collar (not shown) is passed through loops 3 around the bottom surface of housing 2 to fasten bark limiter 1 to the dog's neck. Two stimulus electrodes 5 are threaded into receiving holes 8 (FIG. 2) in the upper surface 9, and their conductive tips are pressed against the dog's neck to make electrical contact therewith when the collar is tightened. As indicated in FIG. 2, stimulus electrodes 5 are removable. A preferably non-conductive stabilizing post of the same height as stimulus probes 5 is rigidly attached to upper surface 9, and is offset from a straight line between stimulus probes 5 so the stabilizing post 7 prevents the conductive electrode tips of stimulus electrodes 5 from "rocking" against the dog's neck. The dog owner can repetitively depress membrane switch 17 to select one of five stimulus intensity levels. The selected intensity level is indicated by illumination of one of the five indicators identified by reference numeral 10. Membrane switch 17 also can be depressed for a 4 second interval to set bark limiter 1 to a test mode, subsequently described.

Figure 3A:
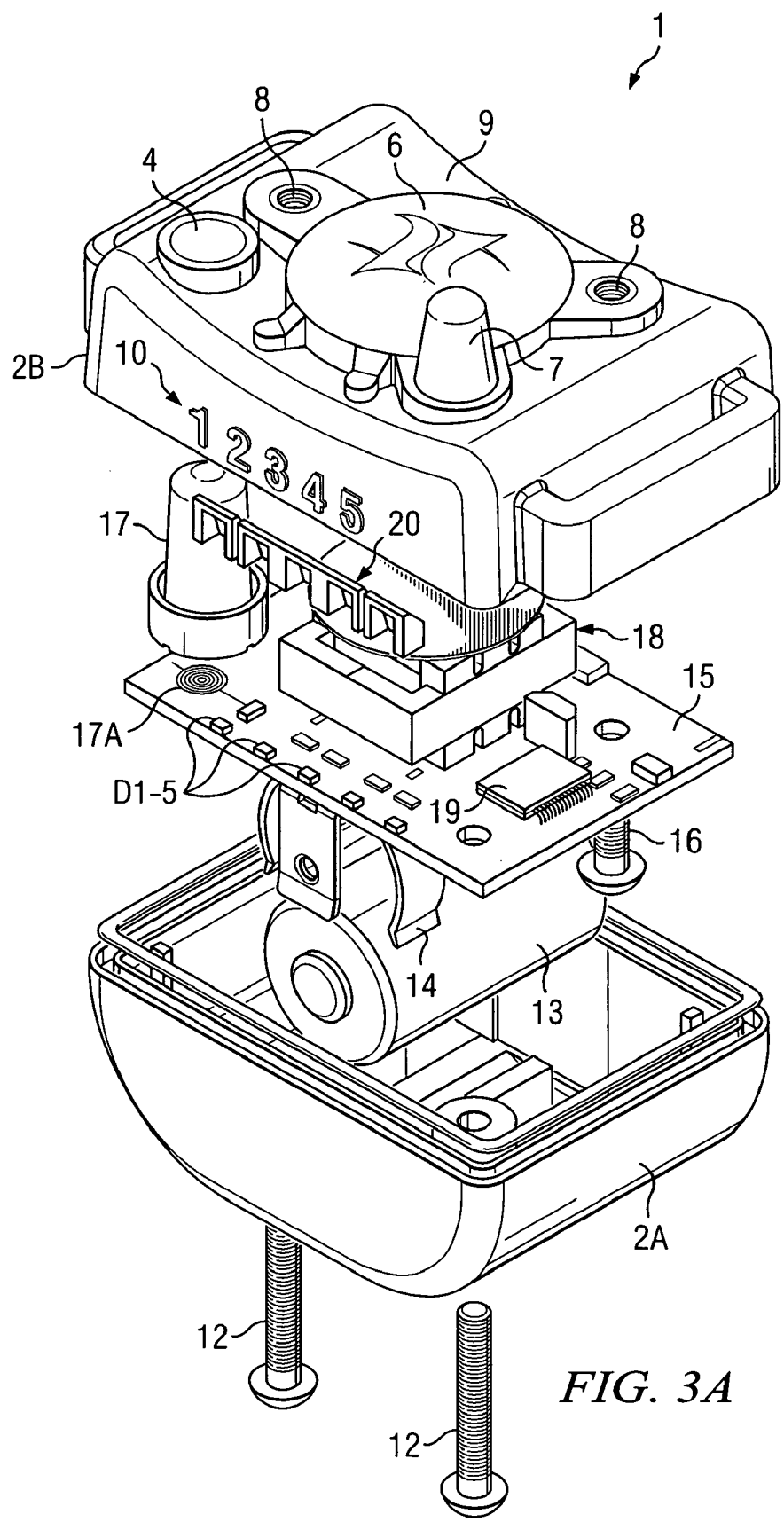
FIG. 3A is a perspective exploded view of the bark limiter unit of FIGS. 1 and 2.
Figure 3B:
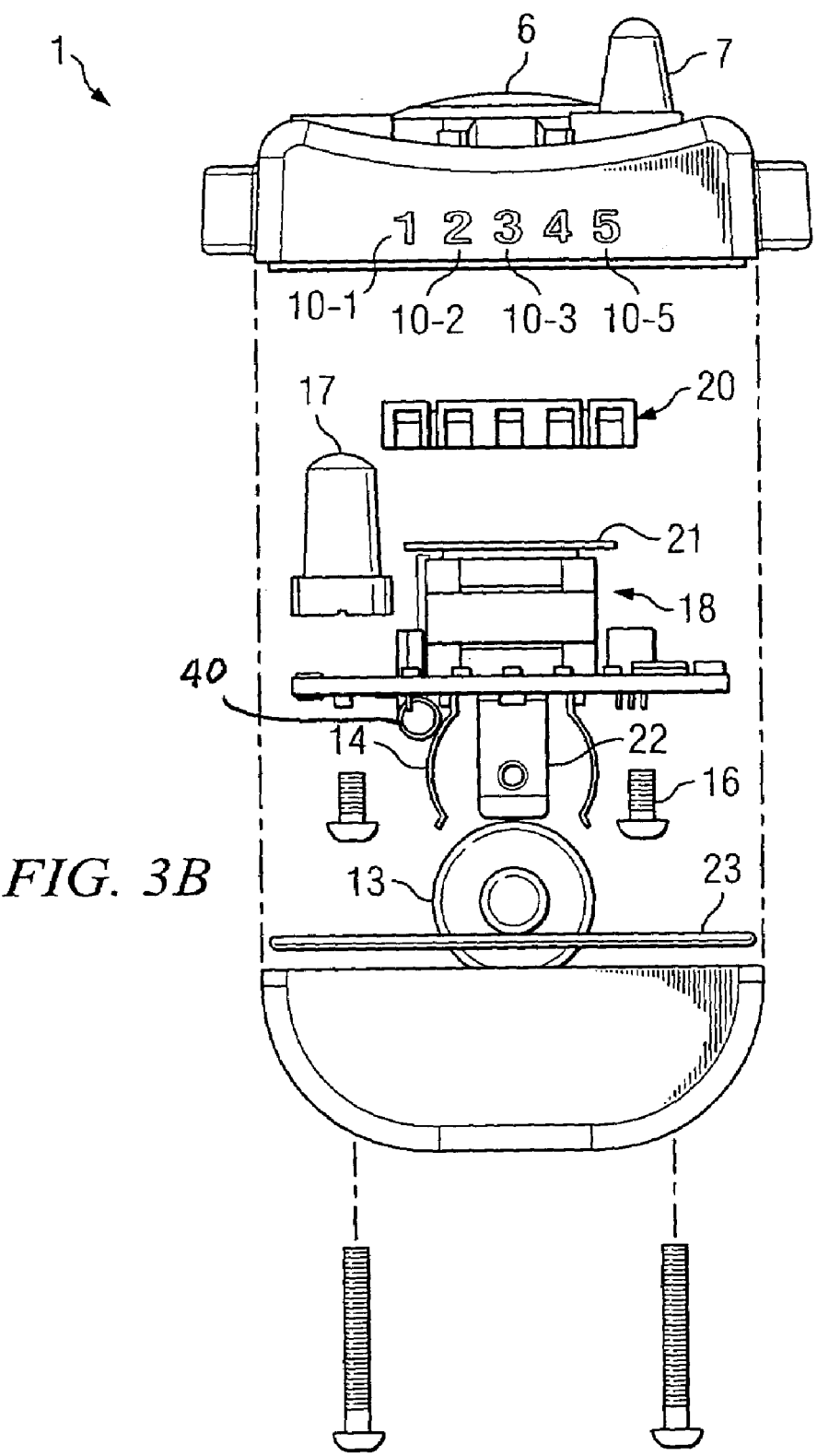
FIG. 3B is a side exploded view of the bark limiter unit as shown in FIG. 3A.

Referring to the exploded views of FIGS. 3A and 3B, lower housing section 2A is attached to upper housing section 2B by means of two screws 12. A printed circuit board 15A contained within housing 2 is attached to upper housing section 2B by means of two screws 16. A 3 volt lithium battery 13 is attached to the bottom of printed circuit board 15A by means of a pair of clips 14. The membrane switch unit 17 is attached to the upper surface of printed circuit board 15A and extends through hole 4 in upper surface 9. A metal trace 17A is contacted to provide a switch closure when the upper surface of membrane switch unit 17 is depressed. An output transformer 18, a microcontroller 19, and five light emitting diodes D1-5 are mounted on the upper surface of printed circuit board 15. As shown in FIG. 3B, a piezoelectric transducer 21 is supported on output transformer 18, and is contacted by a "nipple" 11 (FIG. 5) formed on the underside of dome-shaped membrane 6. Piezoelectric transducer 21 can be a Model P/N: 7BB-20-6 available from Murata Electronics North America, Inc.

The intensity indicators 10-1,2,3,4,5 become illuminated by light emitting diodes D1-5, respectively, as membrane switch 17 is successively depressed. An internal LED reflector element 20, shown in FIGS. 4A and 4B, is mounted on the upper surface of printed circuit board 15 so that the five recesses 25 thereof cover light emitting diodes D1-5, respectively. The five LEDs correspond to indicators 10-1,2,3,4,5 to indicate which stimulation level has been selected by means of the membrane switch 17, and also indicate whether the bark limiter 1 is in a test mode. Holding switch membrane 17 depressed for 4 seconds sets the bark limiter 1 into its test mode, and the various LEDs D1-5 blink, depending on the neck motion and barking by the dog. The LED corresponding to the intensity level selected by means of membrane switch 17 is the one which blinks.

By way of definition, the term "housing" as used herein is intended to encompass any suitable container structure and/or encapsulation material that is used to contain the components of bark limiter 1. The term "bark limiter" is intended to encompass similar devices that detect sounds from animals other than dogs. The bark limiter could be held by a strap against the chest, rather than the neck of an animal.

Figures 1, 4:
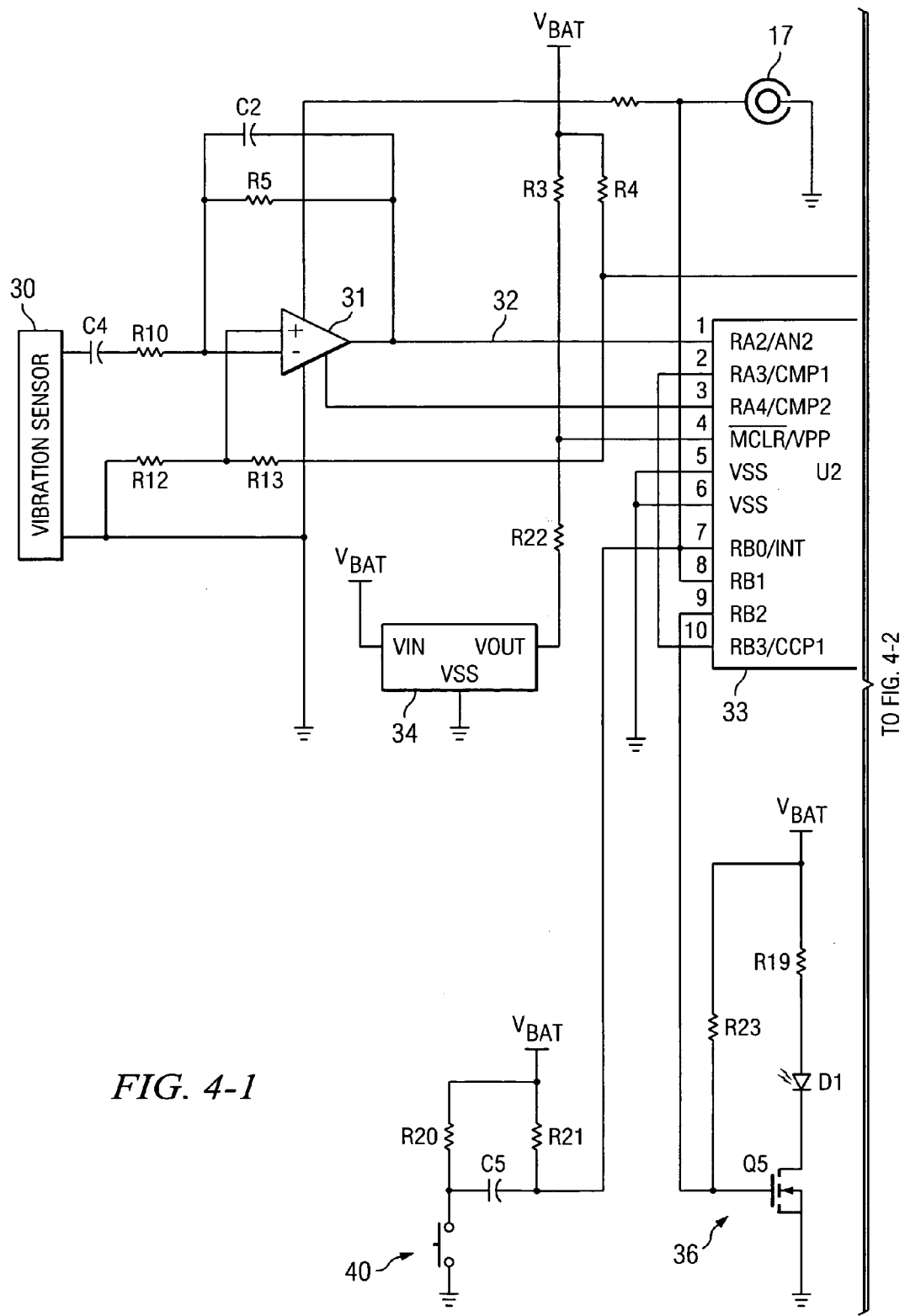
FIG. 4 is a schematic diagram of the circuitry included in the housing of the bark limiter of FIG. 1.
Figures 2, 4:
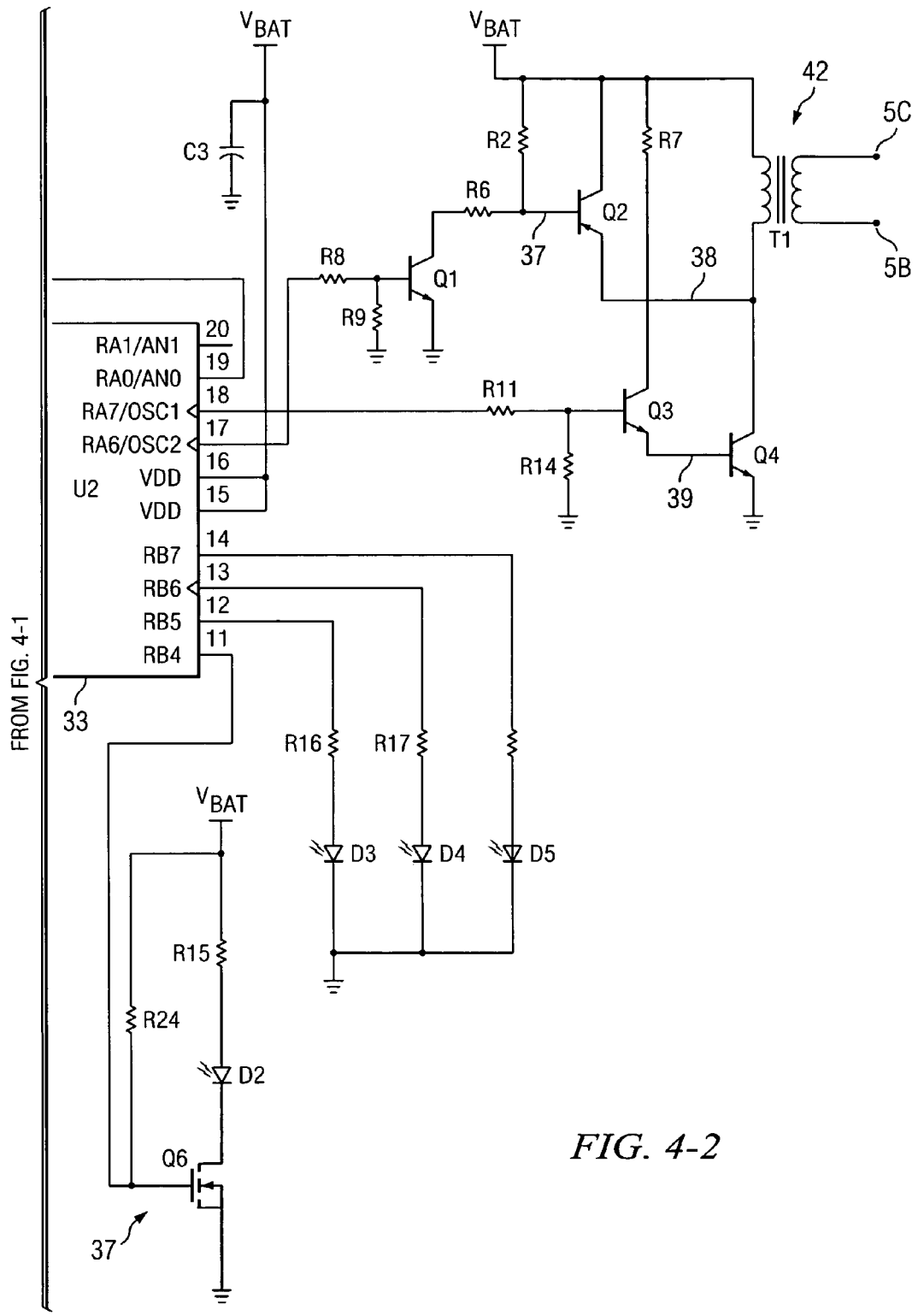

Referring to FIG. 4, the circuitry of bark limiter 1 is provided on the upper surface of printed circuit board 15A (FIG. 3A), and includes vibration sensor assembly 30 which typically includes a piezoelectric transducer under above mentioned dome-shaped membrane 6. One of the electrodes of the piezoelectric transducer is connected to ground and the other is coupled by capacitor C4 and resistor R10 to the (−) input of an operational amplifier 31. The (+) input of operational amplifier 31 is connected to the junction between resistor R12 and resistor R13. The other terminal of resistor R12 is connected to ground, and the other terminal of resistor R13 is connected to one terminal of resistor R4 and to the RA0 input on lead 19 of microcontroller 33. The other terminal of resistor R4 is connected to the battery voltage VBAT.

The output of operational amplifier 31 is connected by conductor 32 to the RA2 input on lead 1 of microcontroller 33 and also is connected to one terminal of capacitor C2 and one terminal of resistor R5. The other terminals of resistors R5 and capacitor C2 are connected to the (−) input of operational amplifier 31. The RA2 input of microcontroller 33 is connected to one input of an internal comparator, the other input of which is connected to the RA0 terminal of microcontroller 33, in order to produce an internal square waveform to be used as an input to the internal microprocessor portion of microcontroller 33, to allow the frequency of the square waveform to be determined. The capacitor C2 functions as a low pass filter that sets the upper cutoff frequency of operational amplifier 31. The resistors R5 and R10 to determine the gain of operational amplifier 31.

Voltage monitor circuit 34 in FIG. 4 produces a low output voltage if VBAT is less than approximately 2 volts, and the junction between resistors R3 and R22, which are coupled in series between VBAT and the output of voltage monitor 34, applies a reset signal to the microcontroller reset input MCLR on lead 4 thereof if VBAT is below approximately 2 volts. A resistor R4, in combination with resistors R13 and R12, forms a threshold circuit that establishes a threshold voltage to be applied to the internal comparator of microcontroller 33 via its RA0 input. The output of the internal comparator of microcontroller 33 is produced on lead 2 of microcontroller 33, which is externally connected to the CCP1 input on lead 2 of microcontroller 33. The CCP1 input of microcontroller 33 is used in the subsequently described compare-capture mode of operation, to measure the periods of the square waveforms on the CCP1 input. This allows the signals produced by vibration transducer 30 and amplified by operational amplifier 31 to be captured within an approximately 120 millisecond interval and, in effect, assembled into a frequency spectrum including sixteen 40 Hz windows in the range from 150 Hz to 800 Hz, which can be used to determine if the present sound is a valid bark.

Actuation of the motion sensor 40 in FIG. 4 results in a signal applied to lead 7 of microcontroller 33 to indicate whether the dog's present neck motion is of the kind characteristically caused by barking. Microprocessor 33 automatically switches from low-power standby operation at 37 kHz to normal operation at 4 MHz if this signal indicates that the dog has begun barking. (In order to properly detect a bark signal, higher resolution is required. The clock speed of microcontroller 33 needs to be at its highest speed in order for to achieve the resolution required.)

The RB2, 4, 5, 6, and 7 outputs of microcontroller 33 selectively turn on LEDs D1-5, respectively, in response to the pressing of membrane switch 17. However, if microcontroller 33 is reset as a result of VBAT being less than 2.2 volts, microcontroller 33 produces high impedance outputs, and in that case, resistors R23 and R24 pull the gate voltages of MOSFETs Q5 and Q6 to VBAT thereby turning them on and allowing the battery to discharge completely through light emitting diodes D4 and D5, turning them both on until the battery is completely dead. If LEDs D4 and D5 emit light simultaneously, that indicates that the battery is discharged and needs to be replaced.

The RA6 output on lead 17 of microcontroller 33 is coupled to the base of an NPN transistor Q1 having its emitter connected to ground and its collector coupled by a resistor R6 to the base of a PNP transistor Q2 having its collector connected to VBAT and its emitter connected by conductor 38 to one terminal of the primary winding of output transformer 42. The base of transistor Q2 also is coupled by a resistor R2 to VBAT. The RA7 output on lead 18 of microcontroller 33 is coupled to the base of an NPN transistor Q3 which has its collector coupled by resistor R7 to VBAT and its emitter connected to the base of an NPN transistor Q4. The emitter of transistor Q4 is connected to ground and its collector is connected to conductor 38. The other terminal of the primary winding of output transformer 42 is connected to VBAT. The secondary winding terminals 5B and 5C are connected to the two stimulus electrodes 5.

Transistor Q4, when turned on, produces a constant collector current for the entire amount of time that transistor Q4 is turned on. If all of the collector current of transistor Q4 flows through the primary winding of transformer 42, that results in delivery of a maximum amount of energy to the primary winding of transformer 42 and therefore in a maximum amount output energy delivered to the stimulus probes 5 by the secondary winding of transformer 42. However, if transistor Q2 is turned on after the peak of a flyback spike that occurs in the waveform of the voltage V38 on conductor 38 immediately after transistor Q4 is turned off, then some of the decaying current in the primary winding of transformer 42 is shunted, causing V38 to rapidly fall to zero. This reduces the amount of energy delivered to the primary winding of transformer 42 for each pulse of the waveform V39 applied to the base of transistor Q4 by microcontroller 33, and therefore also reduces the amount of stimulus energy delivered through stimulus probes or electrodes 5 to the dog's neck.

Microcontroller 33 operates to produce a burst of pulses which are applied to the base of transistor Q4 via the Darlington circuit configuration including transistor Q3. The intensity of the stimulation applied to the dog's neck is controlled by synchronously turning on shunt transistor Q2 to divert a controlled amount of the collector current of transistor Q4 away from the primary winding of transformer 42.

Figures 1, 5:
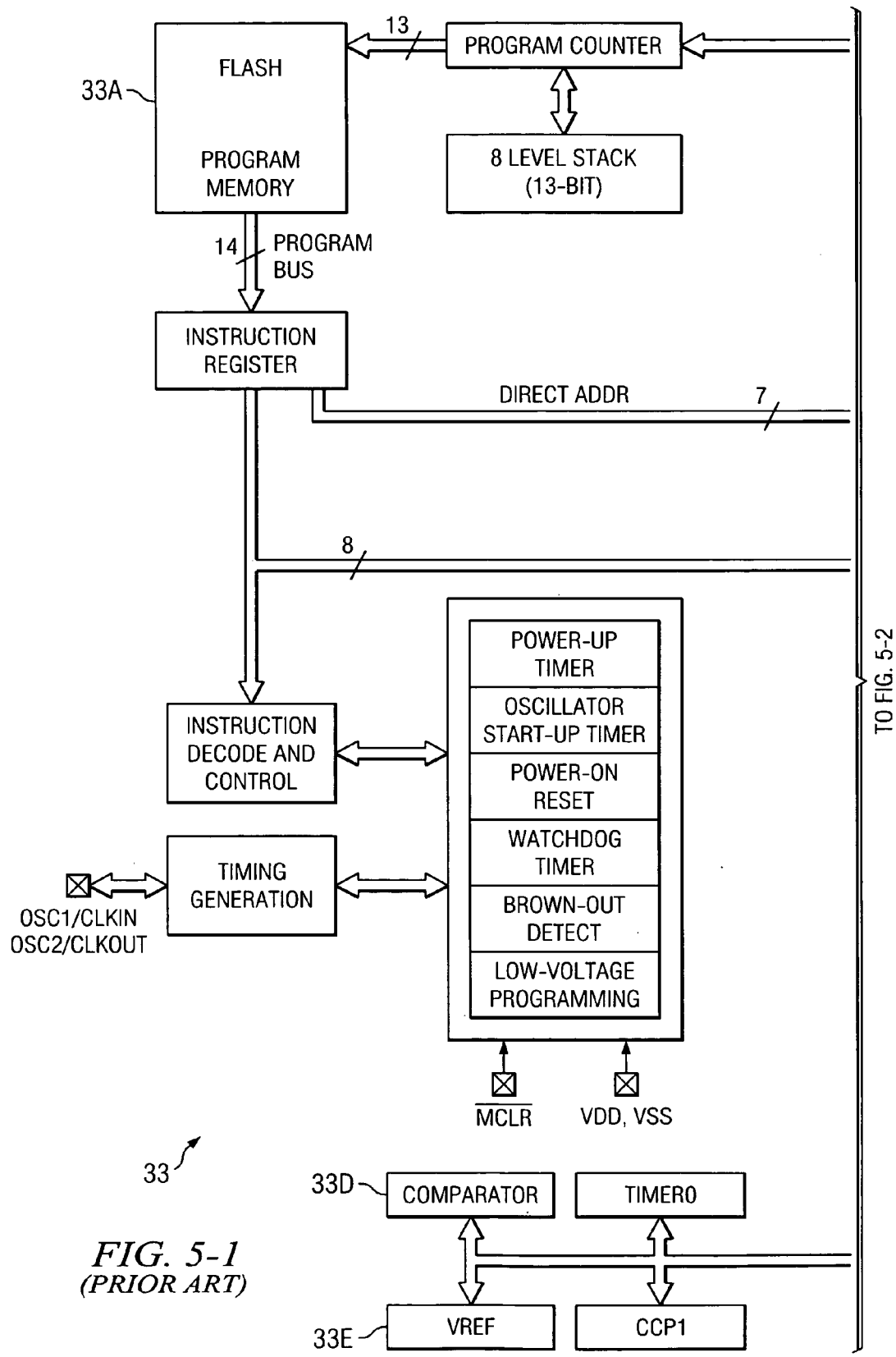
FIG. 5 is a block diagram of the microcontroller 33 shown in FIG. 4.
Figures 2, 5:
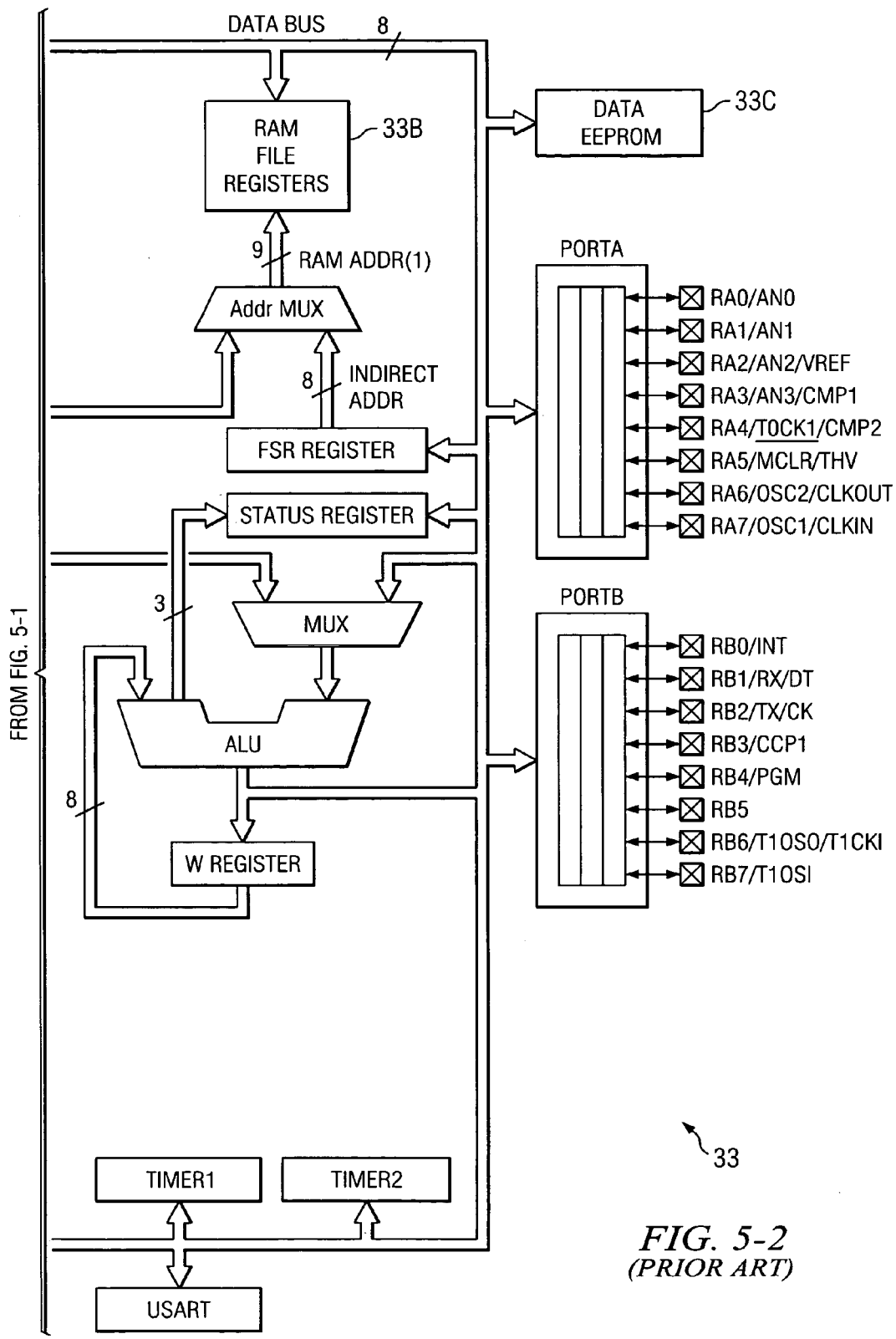

The microcontroller 33 used in the improved bark limiter 1 of the present invention preferably is a PIC16F628 available from Microchip Technology Incorporated, which includes several signal conditioning operational amplifiers, and operates so as to perform the same functions of executing the program represented by the flowchart of FIGS. 6A-E. The details of microcontroller 33 are shown in FIG. 5. As shown in FIG. 5, microcontroller 33 includes a flash memory 33A, a random access memory 33B for storing file registers, and a non-volatile EEPROM 33C for storing the operating program and valid bark detection algorithms. Microcontroller 33 also includes the above-mentioned comparator 33D which generates the signal Data In, and also includes a Vref circuit 33E that produces 1 of 16 voltage levels provided as inputs to the comparator input if the comparator input is configured so that a Vref input is needed.

By way of definition, the terms "controller" and "microcontroller" as used herein are intended to encompass any microcontroller, digital signal processor (DSP), state machine, logic circuitry, and/or programmed logic array (PLA) that performs functions of microcontroller 33 as described above.

Motion sensor 40 can be a Model #SQ-SEN-001P Ultra Compact Tilt and Vibration Sensor, available from SignalQuest Inc. Motion sensor 40 is of a mechanical ball-in-tube construction, and includes a conductive ball that makes contact with appropriate electrodes in response to motion of the dog's neck in order to send the "wake-up" signal to microcontroller 33.

The assignee has discovered that dogs move their heads in a characteristic manner when they bark, and that using a motion detector 40 improves accuracy in detection of "valid" barking. Specifically, the assignee has discovered that when dogs bark, they tend to move their heads and upper torso in a specific motion/pattern motion that can be detected by the above described motion detector 40, although in some instances other types of motion detectors might be used. Motion patterns that are characteristic of barking can be detected using motion detector 40 and, in accordance with the present invention, a captured digitized bark signal can be utilized to provide a frequency spectrum that represents a "valid" bark in order to provide more accurate bark detection that has previously been achieved.

In accordance with the present invention, the vibration detection operation and motion detection operation are combined to determine whether an aversive stimulus signal should be produced between electrodes 5B and 5C. The motion detection is used primarily as part of detection of the correct bark, and is used secondarily to accomplish awakening bark limiter 1 from its sleep mode. Either the subsequently described "valid bark" detection based on the frequency spectrum of signals received from vibration sensor 30 or motion signals based on movement of motion detector 40 could be considered the primary detection function and the other could be considered to be the secondary detection function. The bark limiter could be awakened or powered up in response to barking, and the aversive stimulus could then be triggered by detection of neck motion, or vice versa.

Bark limiter 1 has an external power switch function which is performed by membrane switch 17, and also can be automatically turned on or "awakened" by motion sensor 40 in response to the dog making the kind of characteristic head movement that corresponds to barking by the dog. Motion sensor 40 "wakes up" the bark limiter 1 from a low power stand by condition and stimulates microcontroller 33 to begin looking for a "valid" barking signal/sound. In the low power condition, microcontroller 33 runs at 37 kHz. Once it is awakened, microcontroller 33 runs at 37 kHz, and if any barking signals are detected, microcontroller 33 operates at 4 MHz to process that information, and then returns to a 37 kHz speed.

The ON mode includes both the SLEEP mode and the ES LEVEL CHANGE mode. The OFF mode allows the bark limiter 1 to be awakened as a result of a switch trigger signal produced by depressing switch 17, and if that occurs, the program executed by microprocessor 33 checks to determine if switch 17 is depressed for least 0.1 seconds, and if it is not, automatically goes back into the SLEEP mode. If bark limiter 1 is in both the ON mode and the SLEEP mode, and a signal is received from motion sensor 40, it immediately checks for a bark signal from vibration sensor 30 while microprocessor 33 is internally operating at 4 MHz, and if there is no bark signal from vibration sensor 30, and the internal clock signal is reduced to 37 kHz, waits for a period of 2 seconds, and then reenters the SLEEP mode. Thus, a user can determine if bark limiter 1 is in its ON mode by subjecting bark limiter 1 to sufficient motion to cause motion sensor 40 to produce a motion signal and noticing if the light emitting diodes blink several times.

The two field effect transistors Q5 and Q6 connected in series with LEDs D4 and D5, respectively, are used to indicate that the battery voltage is too low when the voltage monitor circuit produces a voltage below 2.2 volts. When the microcontroller 33 is reset, all of its outputs go to a high impedance state, and LEDs D4 and D5 are turned on. They continue drawing current until the battery is completely dead. Since the operation of the microcontroller is not assured for supply voltages below 2.2 volts, it is set to a "nonoperative", high output impedance condition so to avoid any possibility of unintended stimulation of the dog if the battery voltage is too low.

The assignee has discovered that the nipple 11 which is integral with the under side of dome-shaped membrane 6 conducts vibration energy imparted by the dog to the membrane from the membrane to the vibration transducer more effectively than other sound transducer devices that have been utilized.

The present invention provides an improved technique of bark detection with software by using the internal "Capture/Compare module" of the PIC16LF627 microcontroller 33 to determine "valid" barks. During a 120 ms (or similar) capture time interval, the periods of the various bark signal frequencies are measured and counted. A window of acceptable frequencies in the range of, for example, 150 Hz-800 Hz, is created by the software. This interval or "window" is divided into 16 "buckets" into which the counts of 16 evenly divided frequency ranges are stored. When a bark/sound signal is received, the periods of the bark frequencies are measured during the 120 ms capture interval. The period of the frequency component of the received bark/sound signal is measured, and if the measured period falls within one of the 16 buckets, i.e. frequency ranges, then a software counter assigned to that bucket is incremented. For each complete bark signal/sound captured, the counter totals are compared to predetermined threshold levels for each corresponding bucket, respectively in order to determine whether the bark/sound constitutes a "valid" bark.

A software "bark odometer" is executed by microcontroller 33 to count the number of times the dog is stimulated in response to detection of a valid bark while bark limiter 1 is mounted on the dog. The counter can be determined by the trainer or dog owner when the collar is removed and turned off. This allows the trainer or owner to determine if a particular one of a group of dogs of dogs is a "problem barker", and also allows trainer or owner to recognize how effectively the bark limiter 1 is training a particular dog. For example, numerous valid barks being counted early in the use of bark limiter 1, followed by fewer valid barks as the dog is training progresses, indicates effective training by bark limiter 1. The valid bark count also can provide information that is useful to the user in selecting the most effective setting of electrical stimulus intensity.

Thus, in one embodiment of the invention two control signals are in effect applied by microcontroller 33 to control the energizing of the primary winding of the output transformer, including the constant-width turn-on pulse signal applied to the gate of MOSFET Q4 to establish the constant open circuit voltage produced between the stimulus probes, and also including a shunt control signal which controls the synchronous turn-on of shunt transistor Q2 after the occurrence of the peak value of the flyback voltage on conductor 38 in order to control the amount of energy delivered to the primary winding of the transformer, and therefore the amount of RMS stimulus energy delivered the dog.

The present invention also provides a lightweight bark limiter 1 in a small package which is usable on small dogs yet is capable of providing much higher stimulus levels than the small, lightweight bark limiting devices of the prior art. The membrane switch 17 allows convenient manual selection of the stimulation level to be applied to dog's neck, turning the bark limiter 1 on and off, and self-testing.

A 30 second interval is established when the desired electrical stimulus level is changed or if the bark limiter 1 is turned on. During the 30 second interval, the only thing that can happen is for the user to select the desired stimulus level or to turn bark limiter 1 off. During that 30 second interval the lights blink every second. If the user selects a particular stimulus level, then the 30 second timer is reset.

Figure 6A:
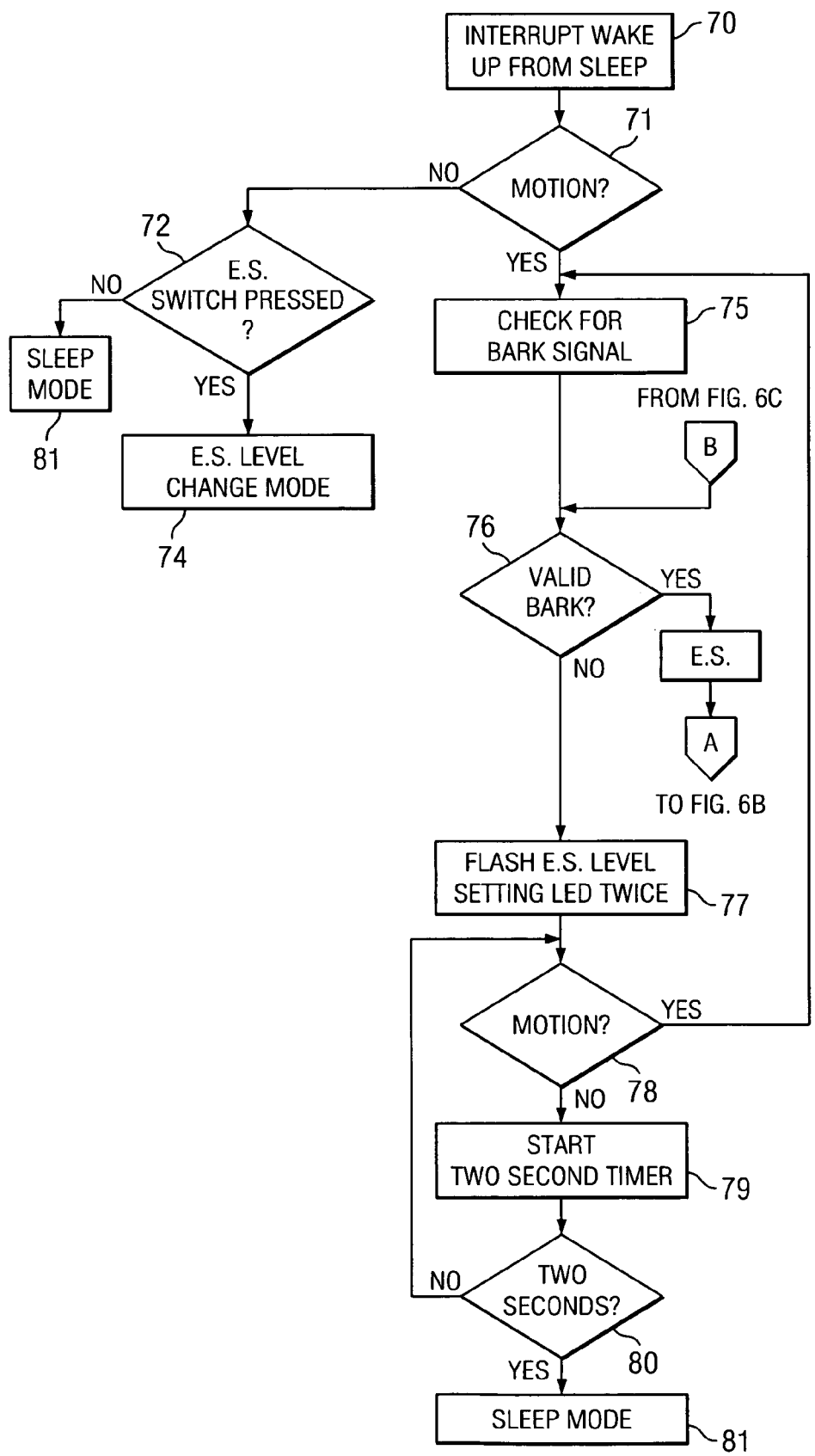
FIGS. 6A-E constitute a flowchart of a group of programs executed by the microcontroller 33 included in FIG. 4.

FIG. 6A shows how bark limiter 1 is awakened from its "SLEEP" mode in response to a motion-indicating interrupt signal from motion detector 40. If a motion signal is received by microcontroller 33, the program goes from decision block 71 to block 75 and checks to determine if any signal is being received on conductor 32 in response to vibration sensor 30. In decision block 76, the program executes the subroutine of FIG. 6C to determine if the spectrum of sound signals received from vibration sensor 30 is the spectrum of a "valid bark". If this determination is affirmative, the program goes to the routine of FIG. 6B to generate an aversive electrical stimulus signal between stimulation electrodes 5B and 5C.

Figure 6B:
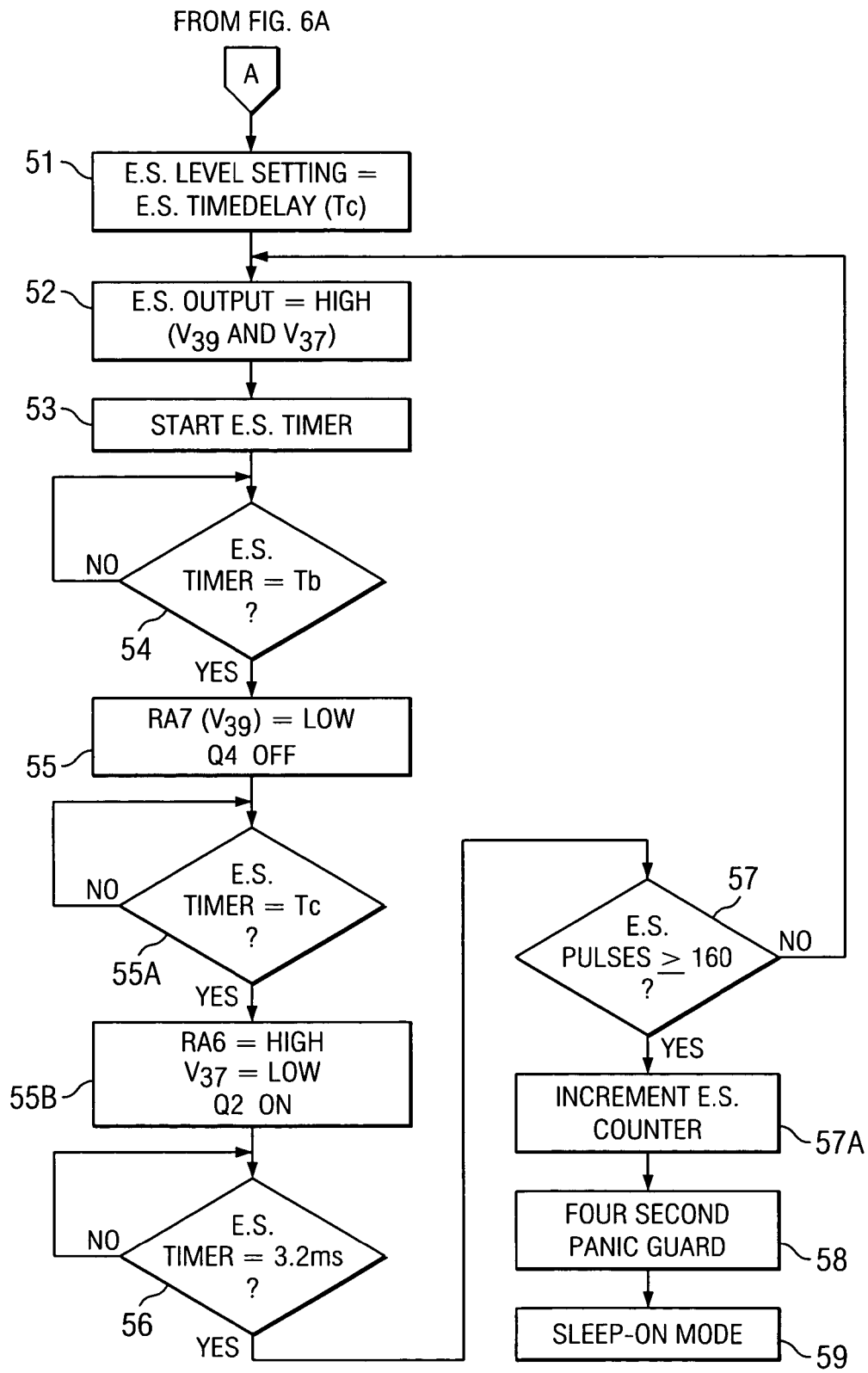

Referring to FIG. 6B, in block 51 the program executed by microcontroller 33 determines the selected stimulation level, i.e., determines the electrical stimulus time delay value that results in production of electrical stimulus levels between electrodes 5 in accordance with the desired intensity level that has been set by means of switch 17 and stores it in the non-volatile memory 33E (FIG. 5). As indicated in block 52, microcontroller 33 sets V37 and V39 to high levels in block 52 in order to switch on the primary winding current in transformer 42, and then in block 53 starts a software timer "ES (electro-stimulus) Timer" to the value "E.S. Time Delay" determined in block 51. The program then goes to decision block 54 and continues to "loop" as long as the count of "ES Timer" of block 53 has a value less than "E.S. Time Delay". After the selected time delay interval has elapsed, the program goes to block 55B and sets the signal RA7 on lead 18 of microcontroller 33 to a low level, which causes V39 to go to a low level and causes a flyback transition of V38 to occur. After a delay Tc has elapsed, as indicated in decision block 55A, the program sets the level RA7 on lead 18 of microcontroller 33 to a high-level, V37 to a low level, and turns transistor Q2 on. Every stimulation pulse produced by microcontroller 33 on the base of transistor Q3 has a duration of 3.2 milliseconds. For every stimulus signal produced by microcontroller 33, block 56 of the program of FIG. 6B causes the stimulus output signal produced by microcontroller 33 on its lead 18 to be at a low level until the 3.2 milliseconds has elapsed.

The program then goes to decision block 57 and determines if the number of stimulus pulses produced by microcontroller 33 is less than or equal to 160 (which corresponds to approximately half a second of electrical stimulation applied between probes 5B and 5C), and if that determination is affirmative, the program goes back to the entry point of block 52 and continues to repeat the foregoing sequence until a negative decision is made in block 57. The program then increments the software bark counter, as indicated in block 57A, and then goes to block 58 and then, as indicated in block 58, starts a 4 second "panic guard" routine to prevent "panic barking" that can be caused by the electrical stimulus experienced by the dog, and then the program causes microcontroller 33 to go into its sleep mode, as indicated in block 59.

Referring again to FIG. 6A, if the decision of block 76 is that no valid bark is occurring, the program goes to block 77 and causes the LED corresponding to the selected stimulation level to flash twice, and then goes to decision block 78 and determines if a signal from motion detector 40 indicates that a significant neck motion is occurring. If this determination is affirmative, the program returns to the entry point of block 75 to determine if a bark signal is being received from vibration sensor 30. If the determination of block 78 is negative, the program goes to blocks 79 and 80 and determines if a 2 second interval elapses without neck motion being detected, and if this happens, the program causes microcontroller 33 to go into its sleep mode, as indicated in block 81.

If the determination of decision block 71 is negative, the program goes to decision block 72 and determines if switch 17 is depressed. If switch 17 is not depressed, the program causes microcontroller 33 to go into its sleep mode. If decision block 72 determines that switch 17 is depressed, the program responds in block 74 by determining and storing the new desired stimulus level established by repetitive depressing of switch 17. Specifically, in block 74 the program determines if switch 17 is depressed for more than 1 second, and if this is the case, increments the stimulation level setting from the present level setting (1-5) to the next level setting and saves the new stimulus level setting.

Figure 6C:
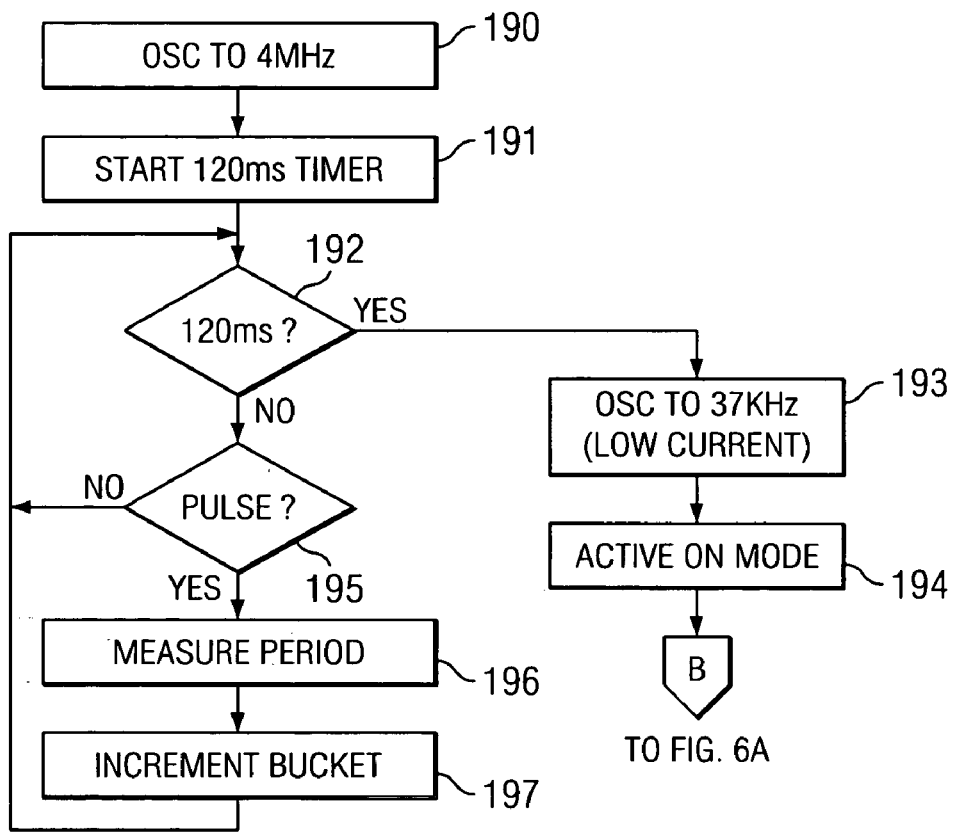

The routine performed in decision block 76 of FIG. 6A is shown in FIG. 6C. Referring to FIG. 6C, in block 190 the program switches the internal oscillator clock frequency of microcontroller 33 from 37 kHz to 4 MHz and then goes to block 191 and starts a 120 millisecond timer, to create a 120 millisecond window within which a "valid bark", if present, is to be "captured". The program then goes to decision block 192 and tests the output of the 120 millisecond timer, and after the 120 millisecond window elapses, the program goes to block 192A and runs a subroutine to determine if the vocalization detected is a valid bark. This is accomplished by comparing the number of times the frequency of the detected vocalization is captured in each frequency range or "bucket" within the 120 millisecond window with a predetermined number of times for each bucket. The program then goes to block 193 and switches the internal oscillator clock frequency of microcontroller 33 back to 37 kHz to provide low power ON mode operation. The program then returns to the entry point of decision block 76 of FIG. 6A. If block 192 determines that the 120 milliseconds timer is still counting, the program then goes to decision block 195 and determines if there is a change in the level of the signal on leads 2 and 10 of microcontroller 33 to indicate that a "pulse" is present. If this determination is negative, the program reenters the entry point of decision block 192, but if the presence of the pulse is detected, the program goes to block 196 and measures the duration of the pulse, and in block 197 increments the frequency spectrum "bucket" or counter which corresponds to the period (i.e., frequency) measured in block 196. The program then reenters decision block 192 and continues the process until the 120 millisecond timer elapses. The "pulse" referred to is generated on lead 2 of microcontroller 33 from an internal comparator therein and is provided as an input to lead 10 of microcontroller 33, which is the "capture and compare" (CCP1) input of microcontroller 33, and automatically starts a timer at the beginning of the pulse and stops the timer at the end of the pulse, so the frequency of the signal coming from vibration sensor 30 is thereby determined and can be used to select the appropriate frequency spectrum bucket to be incremented in order to acquire the frequency spectrum of the present bark signals received from vibration sensor 30 by one input of the internal comparator referred to. Lead 2 of microcontroller 33 is the output of that comparator. The reference applied to the other input of the internal comparator is established by the voltage on lead 19 by the resistive voltage divider circuitry shown in FIG. 4.

Whenever bark limiter 1 enters the ON mode, it checks for neck motion, and if neck motion is detected, the program executed by microcontroller 33 checks for a valid bark. If there is neck motion but no valid bark, the program checks for incrementing of the selected stimulus level by means of switch 17. If no incrementing of the stimulus level by means of switch 17 is occurring, the program causes bark limiter 1 to go into the SLEEP mode.

Note that the OFF mode of bark limiter 1 is different than the above-mentioned SLEEP mode. In the OFF mode, the program checks only to determine if membrane switch 17 is being depressed to turn bark limiter 1 on. The OFF mode only serves as a mode that will be mostly the same as the SLEEP mode, in order to conserve battery life and also in order to allow bark limiter 1 to be removed from an animal in such a way that the motion sensor does not initiate an ON mode. The OFF mode also can be used as a safety feature, in the sense that bark limiter 1 can be turned off when the collar strap is being adjusted or when the bark limiter 1 is being put on or removed from the dog so that there will be no possibility of electrical stimulus being accidentally applied to the dog.

Figure 6E:
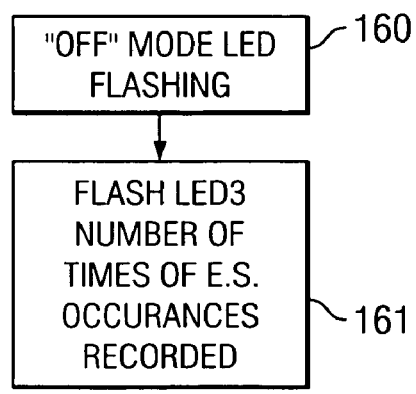
Figure 6D:
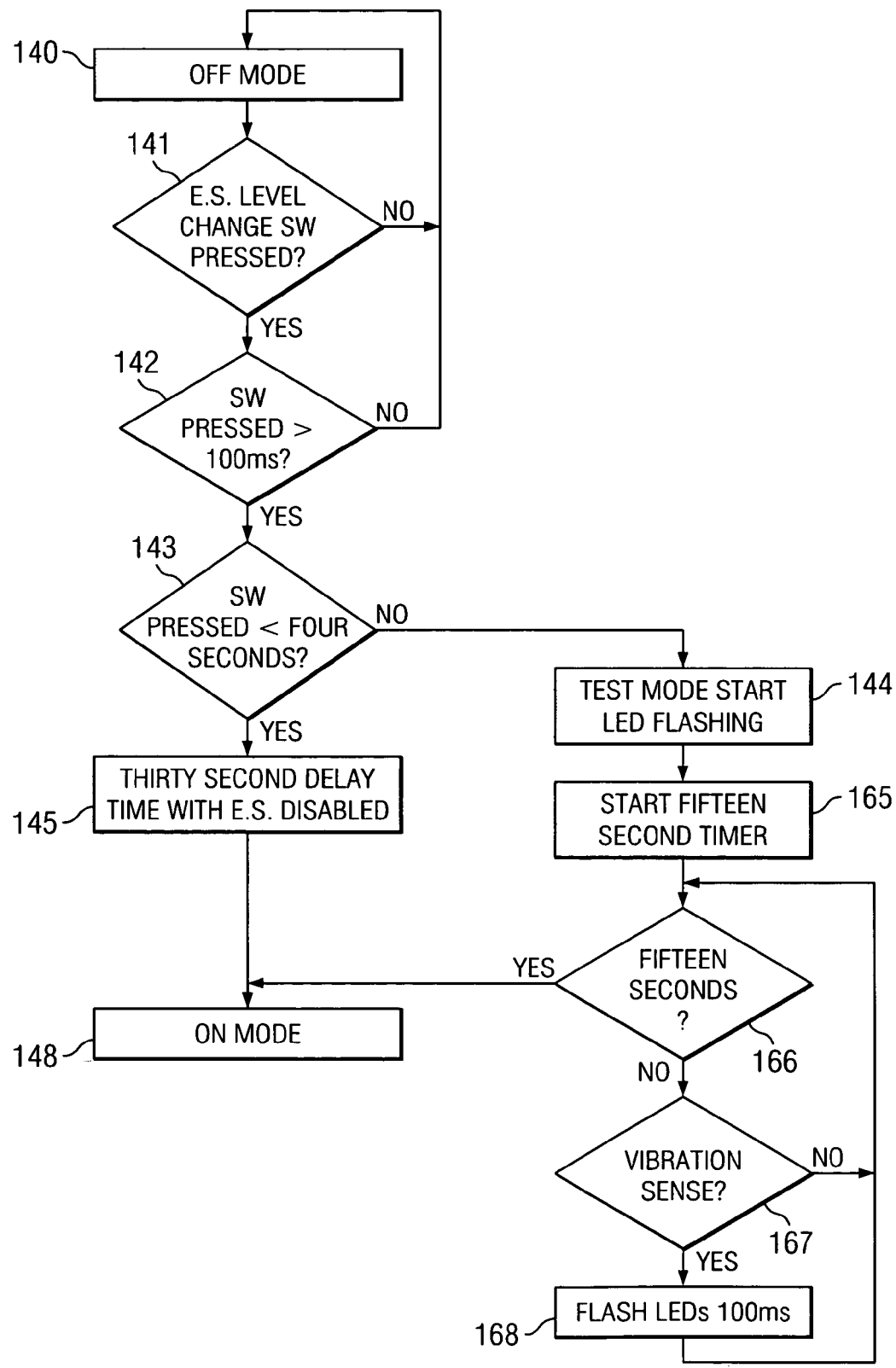

Referring to FIG. 6D, assuming that bark limiter 1 is in its OFF mode as indicated in block 140, the program enters decision block 141 and determines if switch 17 has been pressed, and if this determination is negative, the bark limiter remains in its OFF mode. If switch 17 is pressed, decision block 141 causes the program to enter decision block 142 to determine if switch 17 has been depressed for more than 100 milliseconds, and if this determination is negative, bark limiter 1 remains its OFF mode. After switch 17 has been held depressed for more than 100 milliseconds, the program goes to decision block 143 and determines if switch 17 has been depressed for less than four seconds, and if this determination is negative, the program sets bark limiter 1 to its TEST mode and executes blocks 144 through 168, as subsequently explained. However, if switch 17 has been depressed for less than four seconds, the program goes to block 145 and starts a 30 second delay time with the electro-stimulus capability of bark limiter 1 disabled. The program then goes to decision block 148 and sets bark limiter 1 to its ON mode.

In block 144, the program goes into its "TEST" mode, and that condition is indicated by LEDs 1-5 sequentially turning on and off so as to "sweep" in a sequence that indicates initiation of the self-test mode. The program then starts a 15 second timer, as indicated in block 165, and then goes to decision block 166 which detects whether the 15 second timer has elapsed, in which case bark limiter 1 is put into its ON mode, as indicated in block 148. If the 15 second timer has not elapsed, then the program goes to decision block 167 and determines if any signal is being produced by vibration sensor 30, and if this determination is negative, the program reenters decision block 166. If a signal is being received from vibration sensor 30, the program goes to block 168 and flashes LED 3 for 100 milliseconds, and then reenters decision block 166. Self-testing can be accomplished by scratching membrane 6 (FIG. 3A) vibration sensor 30 during the 15 second duration of the test mode in order to cause LED 13 to flash in block 168, proving the operability of vibration sensor 30.

Referring to FIG. 6E, after a back and forth sweeping pattern of the illumination by light emitting diodes 1-5, different than their sweeping pattern of illumination for initiation of the test mode, to indicate that bark limiter 1 is about to enter its OFF mode, the program then goes to block 161 and causes LED D-3 to flash a number of times equal to the cumulative count in the bark counter to indicate how many stimulation episodes have occurred and resulted in incrementing the stimulation counter referred to in block 57A in FIG. 6B.

Note that it is important that the dog not receive stimulus due to motion alone, because detecting of motion through the motion sensor 40 does not accurately determine the occurrence of valid barking.

Note that the self-test function is performed in a mode of bark limiter 1 in which no electrical stimulation can be produced between electrodes 5B and 5C. The bark limiter 1 can be self-tested only immediately after its is turned on, by pressing switch 17 and holding it down for four seconds to produce the test mode, and then bark limiter 1 remains in the test mode for 15 seconds. The bark odometer function is presently being used as a way of self-testing the unit. The feature of indicating the presently selected stimulation level acts as a self test feature by informing the user that the unit is working. The bark counter content is determined by counting the number of times the middle number three indicator LED 3 blinks after switch 17 has been held pressed for more than 3 seconds. Note that it is important that the dog not be accidentally electrically stimulated if it audibly rubs against something or if miscellaneous vibration is picked up by the vibration sensor 30.

While the invention has been described with reference to several particular embodiments thereof, those skilled in the art will be able to make the various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. An accelerometer or other type of motion detector could be used instead of the above described motion detector. In some cases, a tilt detection switch, such as a mercury switch, might be used instead of a motion detector.

What is claimed is:

1. A collar-mounted electronic apparatus for control of barking by a dog, comprising:
   (a) a housing supported by a collar for attachment to the dog's neck;
   (b) first and second stimulus electrodes in contact with the dog's skin are connected to a surface of the housing for applying aversive stimulus control signals to the dog's neck;
   (c) a vibration sensor supported by the housing in contact with the dog's neck for sensing vibrations and generating vibration signals in response to vocalizing by the dog;
   (d) a controller in the housing having an input coupled to receive the signals produced by the vibration sensor,
   (e) a motion detector mounted in said housing and connected in substantially fixed relationship to the housing for producing a neck motion detection signal in response to a characteristic neck movement of the dog that characteristically accompanies barking by the dog;
   (f) the controller including output terminals for producing aversive stimulus control signals and having an input coupled to receive the neck motion detection signal and operative in response to the neck motion detection signal and signals from the vibration sensor to enable the controller to produce the aversive stimulus control signals; and (g) circuitry coupled to the controller to produce the aversive stimulus signals between the first and second stimulus electrodes in response to the aversive stimulus control signals.

2. The electronic apparatus of claim 1 including circuitry configured to reset the controller from a low-power operating mode into a normal operating mode in response to the neck motion detection signal.

3. The collar-mounted electronic apparatus of claim 1 including a battery monitor circuit coupled to a battery that powers the electronic apparatus, the battery monitor circuit including an output coupled to a reset input of the controller to reset the controller to a non-operative high impedance output mode, a first LED driver circuit having an input coupled to a first LED driver output of the controller, the first LED driver circuit including a light emitting diode having a first electrode coupled by a first resistor to the battery and a second electrode coupled by the transistor to a reference voltage, the transistor having a control electrode coupled by a second resistor to the battery, the control electrode being coupled to the first LED driver output of the controller.

4. A method for controlling vocalization by a dog, comprising:

(a) supporting first and second stimulus electrodes against the dog's neck;

(b) using a vibration sensor for detecting vocalization by the dog and determining if such vocalizing constitutes a valid bark and producing signals in response to such valid bark;

(c) connecting a motion detector in substantially fixed relationship to the dog's neck for producing a motion detection signal in response to a characteristic movement of the neck that characteristically accompanies vocalization by the dog; and (d) operating control circuitry having a first input coupled to receive the signals produced by the vibration sensor in response to a valid bark and a second input coupled to receive the motion detection signal to produce aversive stimulus control signals in response to the signals produced by the vibration sensor if a motion detection signal is received concurrently with the signals produced by the vibration sensor.

5. The method of claim 4 including operating the control circuitry to switch from a low-power operating mode into a normal operating mode in response to the motion detection signal.

6. A device for controlling vocalization by a dog, comprising:

(a) means for supporting first and second stimulus electrodes against the dog's skin;

(b) a vibrations sensor for producing signals in response to vocalizing by the dog;

(c) means for connecting a motion detector in substantially fixed relationship to the dog's neck for producing a motion detection signal in response to a characteristic movement of the dog's neck that characteristically accompanies vocalization by the animal; and (d) means for operating control circuitry having a first input coupled to receive the signals produced by the vibration sensor and a second input coupled to receive the motion detection signal to produce aversive stimulus control signals in response to the signals produced by the vibration sensor if a motion detection signal is received concurrently with the signals produced by the vibration sensor.

7. The device of claim 6 including operating the control circuitry to switch from a low-power operating mode into a normal operating mode in response to the motion detection signal.

* * * * *